United States Patent [19]
Carlson et al.

[11] Patent Number: 5,408,528
[45] Date of Patent: Apr. 18, 1995

[54] METHOD AND APPARATUS FOR FLEXIBLE AND OPTIMAL TELEPHONE CALL ACCEPTANCE AND ROUTING

[75] Inventors: David G. Carlson, Rochester, Minn.; Thomas E. Miller, Menlo Park, Calif.

[73] Assignee: International Business Machines Corporation, Armonk, N.Y.

[21] Appl. No.: 261,315

[22] Filed: Jun. 16, 1994

Related U.S. Application Data

[63] Continuation of Ser. No. 661,732, Feb. 27, 1991, abandoned.

[51] Int. Cl.⁶ ............................................. H04M 3/42
[52] U.S. Cl. ................................... 379/211; 379/201; 379/142; 370/110.1
[58] Field of Search .............. 379/188, 142, 211, 201, 379/265, 266, 94, 96, 210, 212; 370/110.1

[56] References Cited

U.S. PATENT DOCUMENTS

| | | | |
|---|---|---|---|
| 4,277,649 | 7/1981 | Sheinbein | 379/201 |
| 4,797,915 | 1/1989 | Bowker et al. | 379/216 |
| 4,866,762 | 9/1989 | Pintar | 379/188 |
| 4,907,256 | 3/1990 | Higuchi et al. | 379/137 |
| 4,907,259 | 3/1990 | Frech | 379/201 |
| 4,958,153 | 9/1990 | Murata et al. | 370/85.6 |
| 5,029,196 | 7/1991 | Morganstein | 379/211 |
| 5,036,535 | 7/1991 | Gechter et al. | 379/210 X |
| 5,268,958 | 12/1993 | Nakano | 379/211 |

FOREIGN PATENT DOCUMENTS

| | | |
|---|---|---|
| 0347155 | 6/1989 | European Pat. Off. . |
| 0420623 | 9/1990 | European Pat. Off. . |
| 53-136907 | 11/1978 | Japan ............... 379/211 |
| 1-149650 | 6/1989 | Japan ............... 379/210 |

OTHER PUBLICATIONS

"ISDN Feature Telephones", NEC Research & Development, No. 99, Oct. 1990, Tokyo, Japan, pp. 84–89, K. Horibe.
Patent Abstracts of Japan, vol. 13, No. 117 (E-731), Mar. 1989-JP-6328232 Mitsubishi Electric Corp., "Control System For Call Connection in Packet Switching System", S. Kazuyuki. (abstract only).
Patent Abstracts of Japan, vol. 12, No. 207 (E-621), Jun. 1988-JP-63005648 Matsushita Electric, "Line Terminal Equipment":, Y. Yoshiki (abstract only).
Patent Abstracts of Japan, vol. 14, No. 151 (E-906) Mar. 1990-JP-2011048 Matsushita Electric, "ISDN Terminal Equipment", T. Atsushi.
Patent Abstracts of Japan, vol. 15, No. 36 (E-1027) Jan. 1991-JP-2274054 Fujitsu Ltd., "Line Switching Method", M. Naoyuki.
Guaranteed Delay For Voice Traffic In An Integrated Packet-Switched Network, IBM Technical Disclosure Bulletin, vol. 29, No. 9, Feb. 1987, pp. 3756–3758, P. M. Gopal; B. K. Kadaba.

*Primary Examiner*—James L. Dwyer
*Assistant Examiner*—Ahmad F. Matar
*Attorney, Agent, or Firm*—Curtis G. Rose; Steven W. Roth

[57] ABSTRACT

A telephone call is made by a calling party. The telephone call is routed through a telephone network to a piece of terminal equipment. The terminal equipment analyzes call information associated with the telephone call. The call information is divided into separate call attributes, such as calling telephone number and called telephone number. One or more number lists, stored in the terminal equipment, are then searched to see if they contain an entry that matches the call attributes. If a match is not found, the call is rejected. If one or more matches is found, the call is routed as specified by the number list entry having the most optimal match. The number lists can be easily user-modified.

26 Claims, 12 Drawing Sheets

| Calling Party Number | Calling Party Subaddress | Called Party Number | Called Party Subaddress | Day | Occupant Status | Routing Data |
|---|---|---|---|---|---|---|
| *ANY | *ANY | 5071111111 | *ANY | *ANY | NOTBUSY | 01 |
| 6081111111 | *ANY | 5071111111 | *ANY | *ANY | *ANY | 02 |
| *ANY | *ANY | 5072222222 | *ANY | WEEK | WORKING | 03 |
| 5072535331 | 35 | 5072222222 | 21 | MON | WORKING | 04 |
| *ANY | *ANY | 5073333333 | *ANY | *ANY | NOTBUSY | 05 |
| 703# | *ANY | 5073333333 | *ANY | *ANY | *ANY | 06 |
| *ANY | 25 | 5073333333 | 25 | *ANY | NOTBUSY | 06 |
| 5072532557 | *ANY | 5073333333 | *ANY | *ANY | *ANY | 00 |
| *ANY | *ANY | *ANY | *ANY | *ANY | GONE | 10 |

| Calling Party Number | Calling Party Subaddress | Called Party Number | Called Party Subaddress | |
|---|---|---|---|---|
| *ANY<br>*NONE | *ANY<br>*NONE | *ANY<br>*ANY | *ANY<br>*NONE | Number List 01 |
| 5075553311<br>6085551111<br>7121111111 | *ANY<br>16<br>23 | *ANY<br>5073337766<br>5073337766 | *ANY<br>21<br>08 | Number List 02 |
| 608#<br>*ANY<br>*ANY | 16<br>13<br>*ANY | *ANY<br>*ANY<br>*ANY | 99<br>09<br>21 | Number List 03 |

303 — (row 1), 301 — (row 2), 302 — (row 3)

Table 201 (leftmost):
| | | |
|---|---|---|
| 5075553311 | 02 | 01 |
| 6085551111 | 02 | 02 |
| 7121111111 | 02 | 03 |
| 608# | 03 | 01 |
| *ANY | 01 | 01 |
| *ANY | 03 | 02 |
| *ANY | 03 | 03 |
| *NONE | 01 | 02 |

Labels: 201, 205, 209

Table (second):
| | | |
|---|---|---|
| 13 | 03 | 03 |
| 16 | 02 | 02 |
| 16 | 03 | 01 |
| 23 | 02 | 03 |
| *ANY | 01 | 01 |
| *ANY | 03 | 02 |
| *ANY | 03 | 03 |
| *NONE | 01 | 02 |

Labels: 202, 206, 210

Table 203:
| | | |
|---|---|---|
| 5073337766 | 02 | 02 |
| 5073337766 | 02 | 03 |
| *ANY | 01 | 01 |
| *ANY | 01 | 02 |
| *ANY | 02 | 01 |
| *ANY | 03 | 01 |
| *ANY | 03 | 02 |
| *NONE | 03 | 03 |

Labels: 203, 211, 207

Table (rightmost):
| | | |
|---|---|---|
| 08 | 02 | 03 |
| 09 | 03 | 02 |
| 21 | 02 | 02 |
| 21 | 03 | 03 |
| 99 | 03 | 01 |
| *ANY | 01 | 01 |
| *ANY | 02 | 01 |
| *NONE | 01 | 02 |

Labels: 204, 208, 212

| Calling Party Number | Calling Party Subaddress | Called Party Number | Called Party Subaddress | Day | Occupant Status | Routing Data |
|---|---|---|---|---|---|---|
| *ANY | *ANY | 5071111111 | *ANY | *ANY | NOTBUSY | 01 |
| 6081111111 | *ANY | 5071111111 | *ANY | *ANY | *ANY | 02 |
| *ANY | *ANY | 5072222222 | *ANY | WEEK | WORKING | 03 |
| 5072535331 | 35 | 5072222222 | 21 | MON | WORKING | 04 |
| *ANY | *ANY | 5073333333 | *ANY | *ANY | NOTBUSY | 05 |
| 703# | *ANY | 5073333333 | *ANY | *ANY | *ANY | 06 |
| *ANY | 25 | 5073333333 | 25 | *ANY | NOTBUSY | 06 |
| 5072532557 | *ANY | 5073333333 | *ANY | *ANY | *ANY | 00 |
| *ANY | *ANY | *ANY | *ANY | *ANY | GONE | 10 |

```
                    Work with Number List Entries
                                                        System:    RCHAS320
Connection list . . . . . :   NL1

Type options, press Enter.
  1=Add   2=Change   3=Copy   4=Remove   5=Display details   7=Rename Option  Entry       Description _     ROW1        Row 1 of Number List 02
  _     ROW2        Row 2 of Number List 02
  2     ROW3        Row 3 of Number List 02

Bottom
Parameters for options 1, 2, 7 or command
===>
F3=Exit   F4=Prompt   F5=Refresh   F9=Retrieve   F11=Display remote numbers
F12=Cancel   F17=Position to   F8=Change weighting factors
```

FIG. 7A

```
                    Change Number List Entry

Type choices, press Enter.

Connection list . . . . . . . . . .  >NL2            Name
Entry . . . . . . . . . . . . . . .  >ROW3           Name Attribute 1 . . . . . . . . . . . .  >712111111
Attribute 2 . . . . . . . . . . . .  >23
Attribute 3 . . . . . . . . . . . .  >5073337766
Attribute 4 . . . . . . . . . . . .  >08

F3=Exit   F4=Prompt   F5=Refresh   F12=Cancel   F13=How to use this display
F24=More keys
```

FIG. 7B

```
Change Weighting Factors

Type choices, press Enter.

Attribute 1
  Weighing Factor  . . . . . . . . . . .>   1.0
Attribute 2
  Weighing Factor  . . . . . . . . . . .>   0.5
Attribute 3
  Weighing Factor  . . . . . . . . . . .>   1.0
Attribute 4
  Weighing Factor  . . . . . . . . . . .>   1.0

F3=Exit   F4=Prompt   F5=Refresh   F12=Cancel   F13=How to use this display
F24=More keys
```

FIG. 7C

METHOD AND APPARATUS FOR FLEXIBLE AND OPTIMAL TELEPHONE CALL ACCEPTANCE AND ROUTING

This application is a continuation of application Ser. No. 07/661,732 filed Feb. 27, 1991, (now abandoned).

FIELD OF THE INVENTION

This invention relates to the data processing field. More particularly, this invention allows the recipient of a telephone call to analyze call information associated with the telephone call to determine optimal routing of the telephone call.

BACKGROUND OF THE INVENTION

The telecommunications industry has seen significant technological advancements in the last few years. Long gone are the days of yesteryear where the telephone was praised as a simple, handy, and relatively private device used to communicate primarily with friends, loved ones, and local merchants.

Today, the owner of a telephone is as likely to curse the telephone as to praise it. He is often greeted upon his arrival home after a long day of work with a barrage of unsolicited phone calls originating from parties unknown, all trying to sell him their particular goods or services. Screening of incoming calls via use of an answering machine is a partial answer, but tends to annoy family, friends, and others known by the owner of the telephone to have a less sinister reason to call, since all calls must go through the answering machine to be screened. In addition, many "friendly" callers have a condition known as "answering machine phobia" and will hang up after a short number of rings so as not to get the answering machine.

Some of the regional telephone companies in the United States now offer their customers a service called "Caller ID". Caller ID displays the telephone number of the incoming call to the telephone owner as the telephone rings. The owner can look at the number and decide whether he should answer the call or not. Although Caller ID has several advantages over answering machines, it has its limitations. Often, the owner cannot remember if the telephone number being displayed is one he recognizes as being "friendly" or not, and often errs in answering the phone when he didn't want to and vice versa.

The technological "advancements" of the telephone have caused other problems for the owner of the phone as well. When the owner wants to initiate a call to a business to inquire about goods or services, the friendly local merchant of yesteryear often no longer answers the phone. Instead, the owner's call is received by a complex telemarketing facility located somewhere in the world. The owner must then often endure delay and frustration as his call is bounced around inside the telemarketing facility in a search for a telemarketer possessing the skills necessary to respond to this specific inquiry. The owner may also be required to respond to a complex series of prompts emanating from a recorded, robot-like voice by pressing a series of numbers or other characters on the telephone keypad. These crude methods of call routing are unsatisfactory to the telemarketing facilities as well, since their telemarketers are being used inefficiently. More importantly, their customers are unhappy and agitated, and may decide to take their business elsewhere.

SUMMARY OF THE INVENTION

It is a primary object of the invention to provide an enhanced mechanism for handling incoming telephone calls.

It is another object of the invention to provide an automated mechanism for efficiently screening out unwanted calls.

It is another object of the invention to provide an automated mechanism for efficiently routing an incoming telephone call to an optimal destination.

These and other objects are accomplished by the method and apparatus for flexible and optimal telephone call acceptance and routing disclosed herein.

A telephone call is made by a calling party. The telephone call is routed through a telephone network to a piece of terminal equipment. The terminal equipment analyzes call information associated with the telephone call. The call information is divided into separate call attributes, such as calling telephone number and called telephone number. One or more number lists, stored in the terminal equipment, are then searched to see if they contain an entry that matches the call attributes. If a match is not found, the call is rejected. If one or more matches is found, the call is routed as specified by the number list entry having the most optimal match. The number lists can be easily user-modified.

DESCRIPTION OF THE PREFERRED EMBODIMENT

Figure 1:
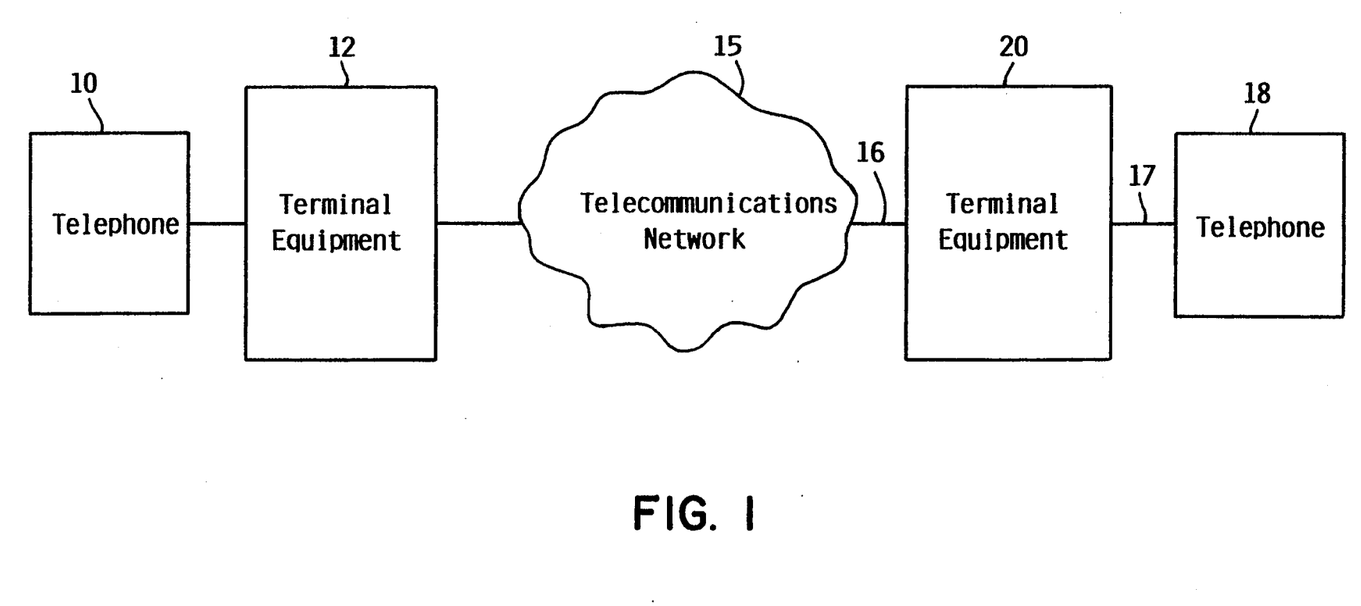
FIG. 1 shows the communications environment of the invention.

FIG. 1 shows the communications environment of the invention. Telephone 10 is able to originate a call that is received by telephone 18 via terminal equipment 12, telecommunications network 15, and terminal equipment 20. In the preferred embodiment, network 15 is an Integrated Services Digital Network, more commonly known as ISDN, although other telecommunications networks, from present-day DTMF-based networks to future networks not yet contemplated, could also be used. Any telecommunications network capable of transmitting call information associated with a telephone call could be used.

Network 15 supports connection of up to thousands of pieces of terminal equipment such as terminal equipment 12 and terminal equipment 20 shown in FIG. 1. The terminal equipment connected to network 15 supports the protocol of network 15 and allows for communications to occur between pieces of terminal equipment and any attached telephones. Although FIG. 1 shows one telephone connected to each piece Of terminal equipment, anywhere from zero to several hundred telephones could be connected to each piece of terminal equipment.

Terminal equipment 12 could reside in the same physical location as its supported telephones or be remotely located in a local, regional, or national telephone exchange. While in the preferred embodiment, telephone 10 and terminal equipment 12, and telephone 18 and terminal equipment 20, are discrete components, in an alternate embodiment a telephone and terminal equipment can be combined into a single unit. This combination may be particularly appropriate in a residential or small office environment, where a powerful piece of terminal equipment connected to hundreds of telephones is not needed.

Figure 2:
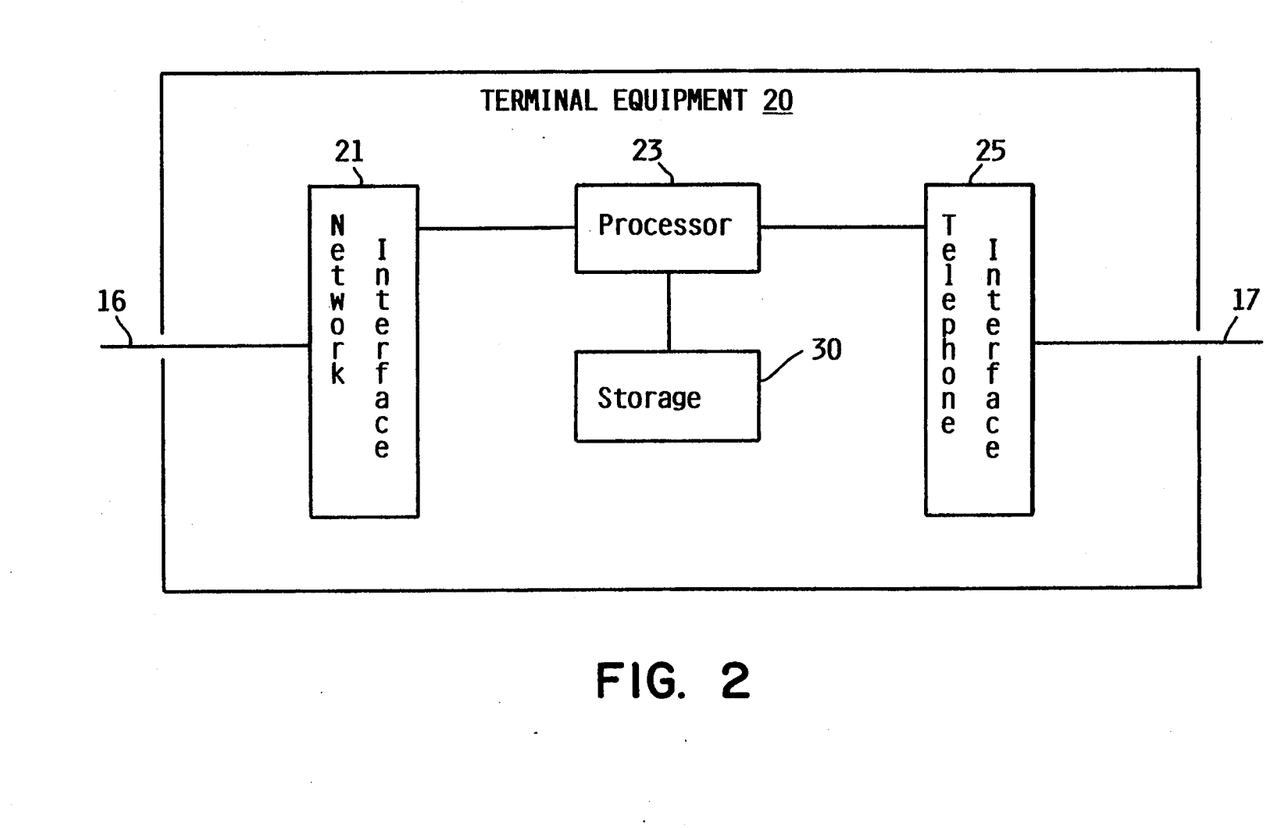
FIG. 2 shows the terminal equipment of the invention.

FIG. 2 shows terminal equipment 20 in more detail. Terminal equipment 20 contains network interface 21, processor 23, storage 30, and telephone interface 25. Network interface 21 allows terminal equipment 20 to communicate with network 15. Network interface 21 receives telephone Calls originated by other telephones in the network, and also transmits telephone calls originated by telephones connected to terminal equipment 20 via line 17. Line 17 is not required if there are no telephones to connect to, such as for data calls between pieces of terminal equipment, or instances where the terminal equipment answers voice calls via digitized speech or routes calls back through network 15.

Figure 6A:
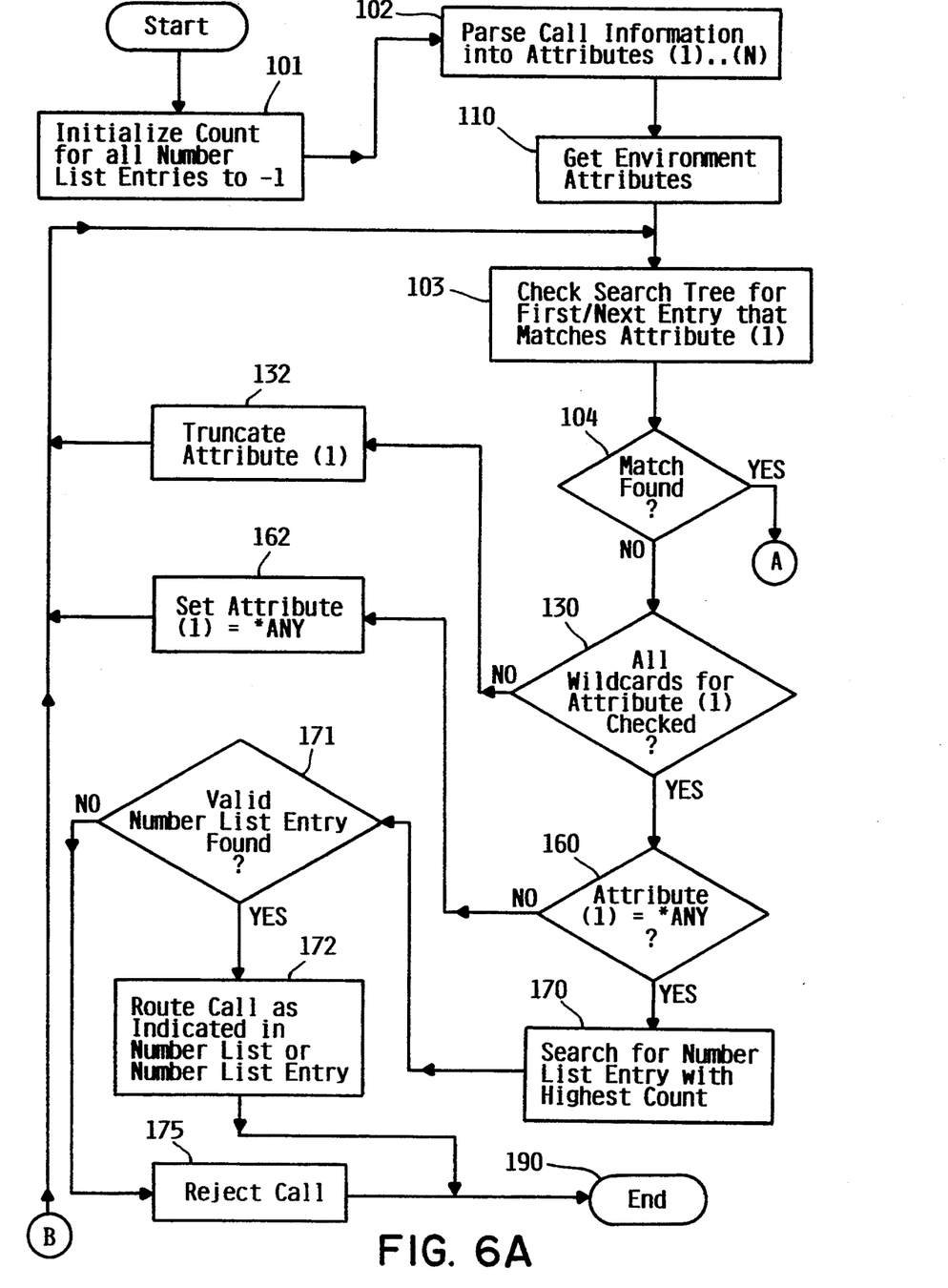
FIGS. 6A-6C show a flowchart of the suitably programmed terminal equipment of the invention.
Figure 6B:
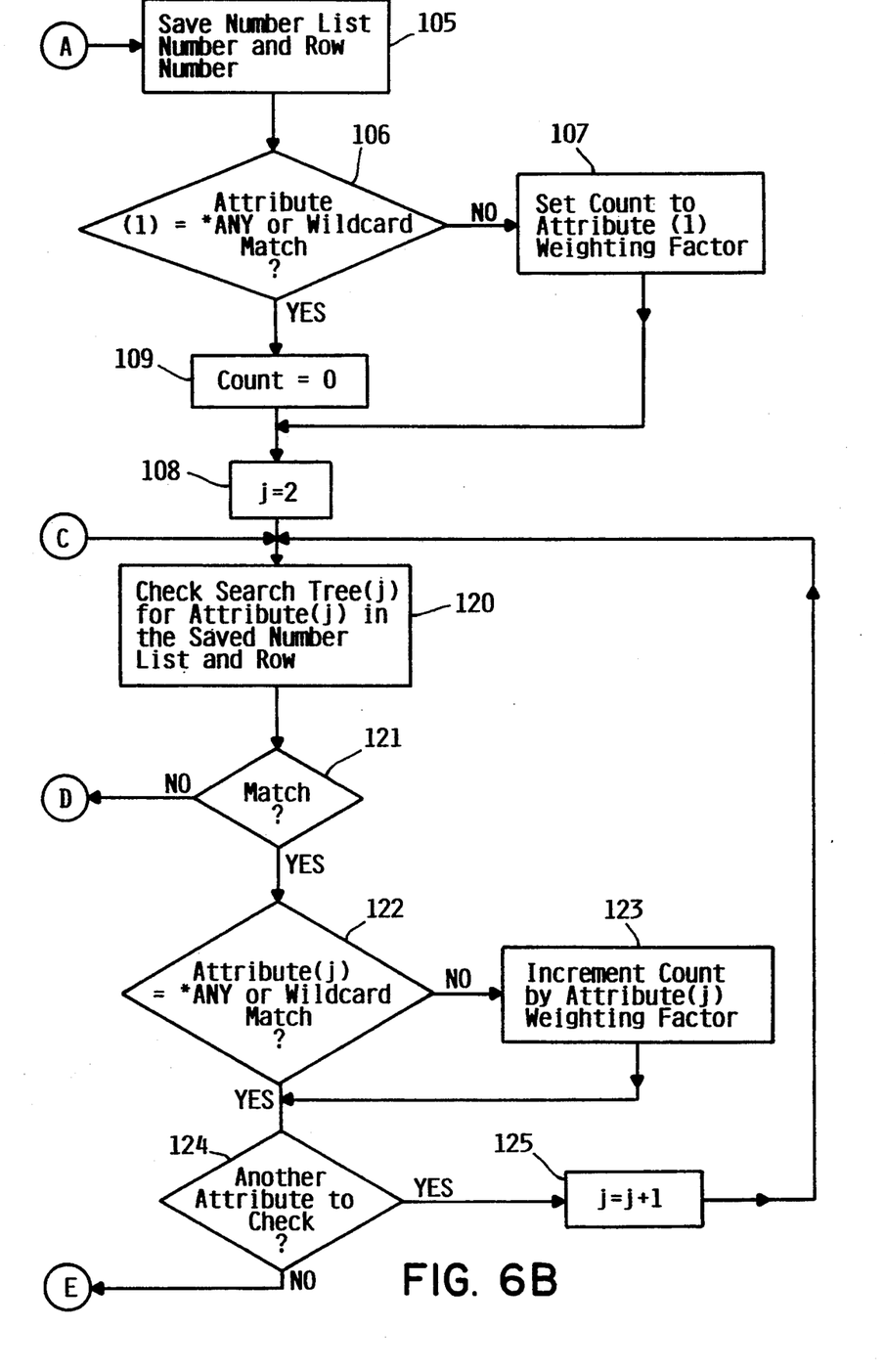
Figure 6C:
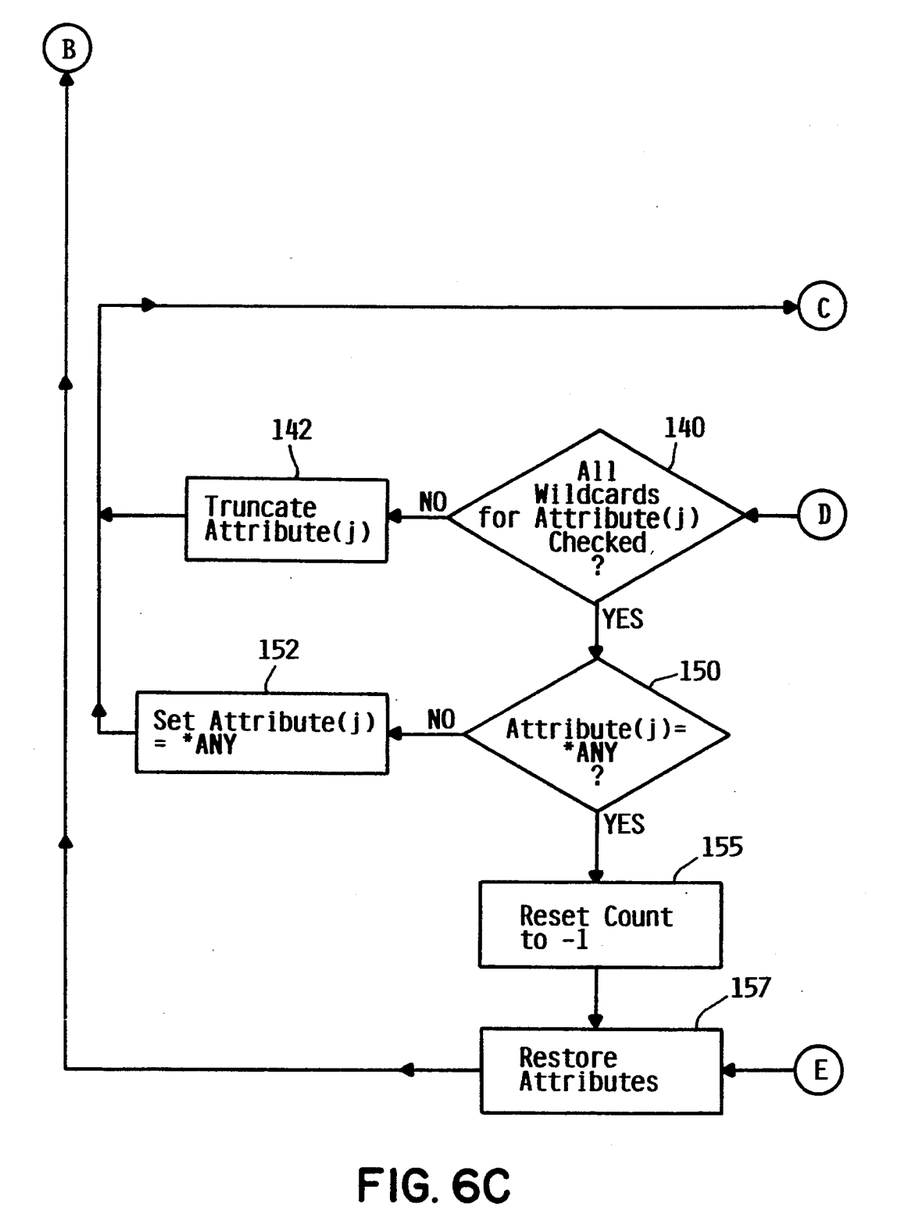

Processor 23, suitably programmed as shown in the flowchart of FIGS. 6A–6C, performs the acceptance/rejection and optimized routing of incoming telephone calls received by terminal equipment 20, as will be discussed in more detail later. Processor 23 could be a very simple microprocessor, Such as an Intel 8088, or be part of a more complex processing environment found in microcomputers, midrange computers, or even mainframe computers.

Telephone interface 25 is connected to processor 23 and allows terminal equipment 20 to communicate with one or more telephones such as telephone 18 (FIG. 1) connected to telephone interface 25 via line 17. The complexity of telephone interface 25 depends largely on the number of telephones supported by terminal equipment 20. If only one or at most a few telephones are supported, telephone interface 25 could be very simple switching logic found in conventional multiplexors or other logic gates well known to those of skill in the art. Telephone interface 25 is not required if terminal equipment 70 is not connected to any telephones. Conversely if dozens, hundreds, or even thousands of telephones are supported, telephone interface 25 becomes much more complex. The power of a Private Branch Exchange (PBX) or similar device or a software program capable of communicating with such a device may be desirable.

In the preferred embodiment, processor 23 and storage 30 are components of an Application System/400 midrange Computer system manufactured by International Business Machines-Corporation. Network interface 21 is an ISDN Basic Rate Interface adapter integrated into the AS/400. Line 16 is an RJ45 cable. Telephone interface 25 is a CallPath/400 telephony enabler licensed program product, also manufactured by the IBM Corporation. Further details concerning the communications environment of the preferred embodiment can be seen in the unpublished IBM Manual "Communications: Integrated Services Digital Network Guide (SC41-0003), hereby incorporated by reference and attached hereto as Appendix I and in the IBM Manual "Communications: CallPath/400 Programmer's Reference" (GC21-9867), also hereby incorporated by reference and attached hereto as Appendix II.

Referring again to FIG. 2, Storage 30 is connected to processor 23. Storage 30 contains data used by suitably programmed processor 23 to decide whether to accept or reject an incoming call, and, if accepted, route the call to the appropriate telephone. The contents of storage 30 is shown in more detail in FIG. 3. Storage 30 contains one or more number lists 31 and one or more search trees 32. Each number list in storage 30 contains the same number of rows (such as row 33) and columns (such as column 34) as the other number lists in storage 30. Each row of a number list is a number list entry. A number list entry contains one or more columns of number list data. As will be seen in more detail later, the number list data is used to determine optimized routing or rejection of an incoming call. The number of rows, columns, and number lists is variable and can change depending on the functionality desired.

Figure 3:
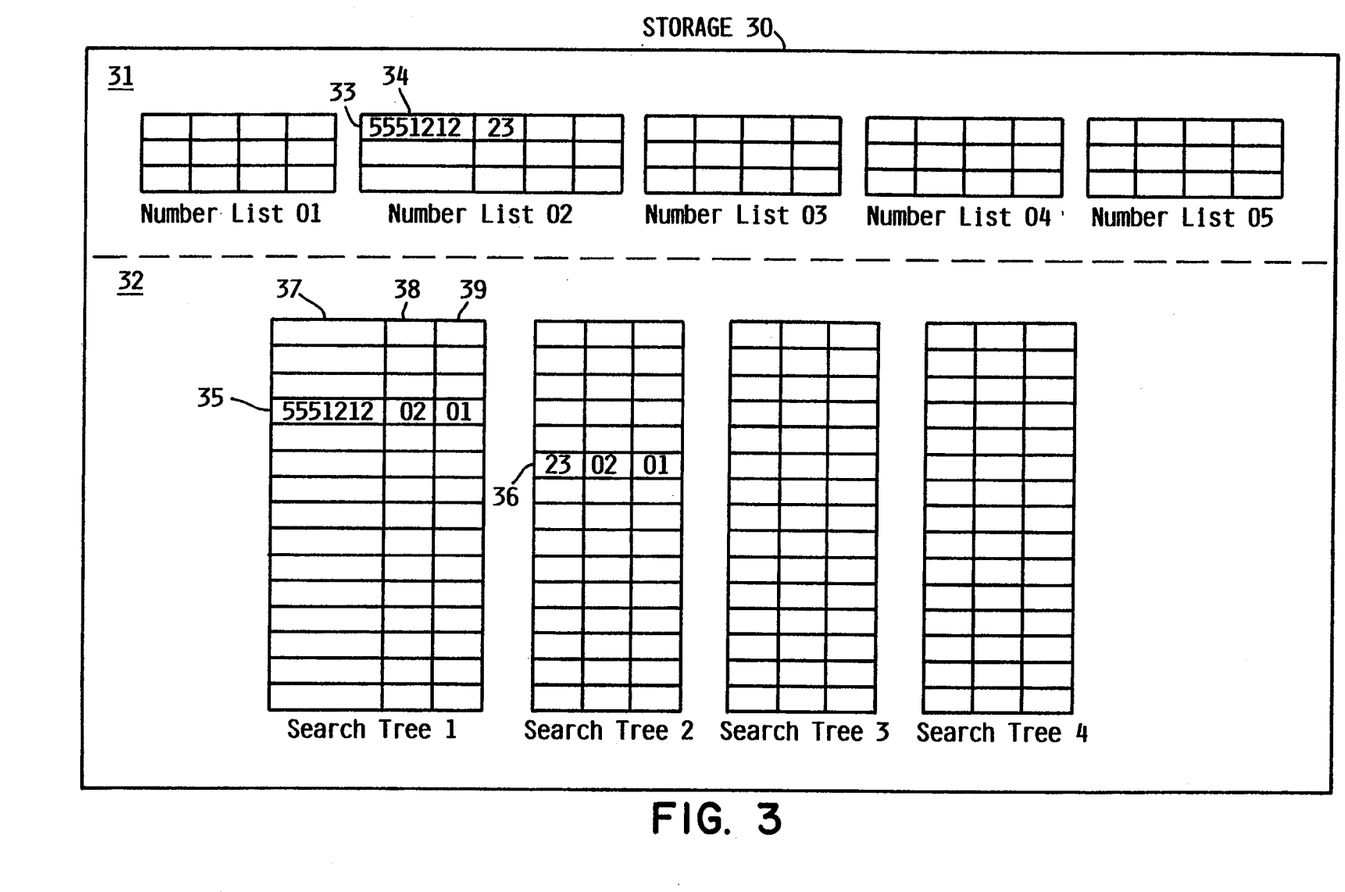
FIG. 3 shows the contents of the storage of the terminal equipment of the invention in more detail.

Search trees 32 are used in the preferred embodiment to speed up the searching of the number list data, but are not required in an alternate embodiment. If search trees 32 are used, one search tree exists for each column (such as column 34) of a number list. Since each number list in number lists 31 contains four columns, four search trees are shown as search trees 32.

Each search tree contains entries, such as entry 35. A search tree contains a number of entries that equals the total number of number list entries in all number lists. Since there are a total of fifteen number list entries in number lists 31, each search tree contains fifteen entries.

The first search tree contains number list data from the first column of each number list. A search tree entry contains three columns of search tree data. Column 37 of search tree entry 35 contains number list data in the first row and first column of the second number list (shown here as "5551212"). Column 38 contains an indication of the number list from which this number list data came (shown here as "02"—indicating number list 02). Column 39 contains an indication of the row in the number list from which this number list data came (shown here as "01"—indicating the first row of the number list).

In the preferred embodiment, the search tree entries are sorted by number list data, number list, and row to improve performance. For example, the three entries preceding entry 35 would contain number list data from the first column of the number lists entries with numbers smaller than "5551212". The remaining entries following entry 35 in the first search tree would contain number list data from the first column in the remainder of the number lists entries with numbers larger than "5551212" followed by any wild card entries (such as "608#") and any generic entries (such as "*ANY").

The second search tree contains number list data from the second column of each number list again sorted to improve performance. Entry 36 contains number list data from the first row of the second column of the second number list (shown here as "23"). The remainder of the second search tree, as well as the third and fourth search trees, follow the same organizational pattern. As one of skill in the art would quickly realize, the search tree organization pattern shown here is but one of several different but equivalent possible organization patterns that could be used to speed up the searching of number list data.

Figure 4A:
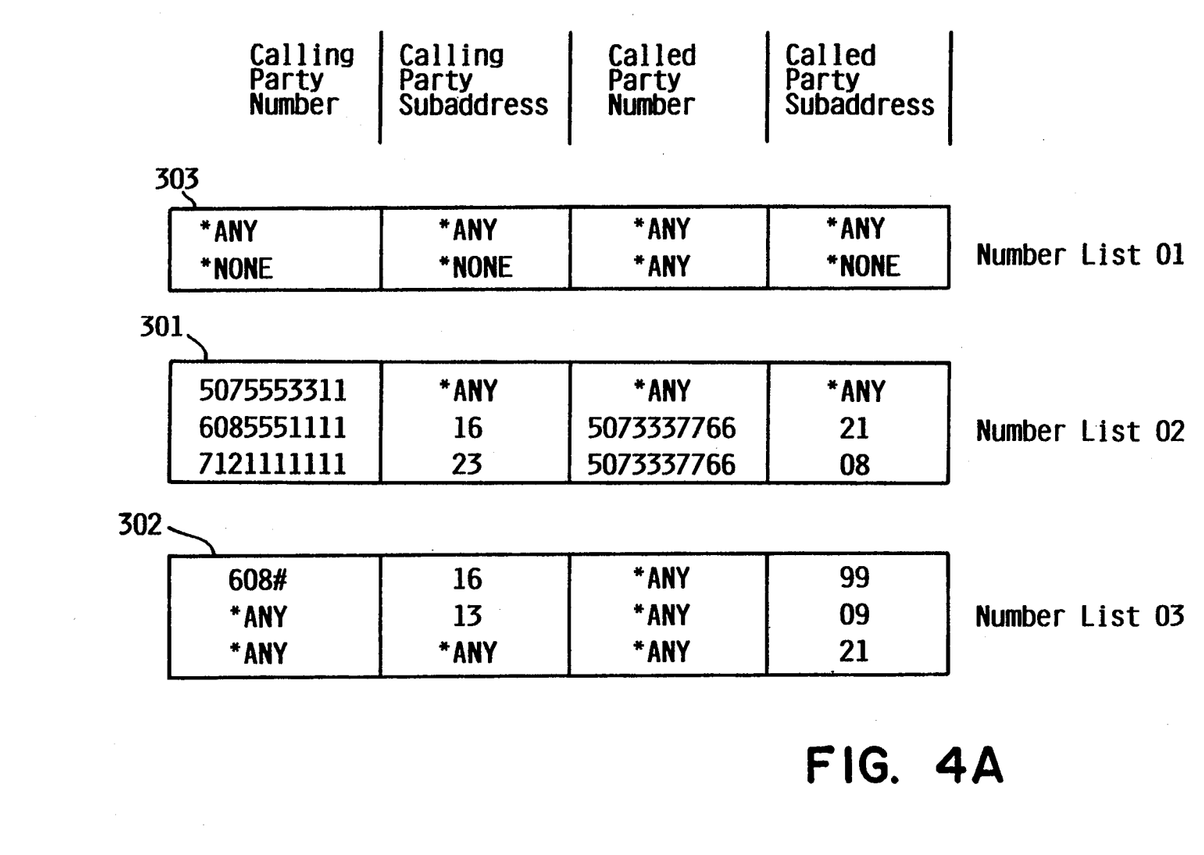
FIG. 4A shows exemplary number lists of the invention used in the preferred embodiment.

FIG. 4A shows exemplary number lists of the invention that could be used in an inbound telemarketing application, where the terminal equipment receives thousands of calls daily. Three number lists are shown. These number lists contain four columns of number list data. The first column contains the calling party's telephone number. The second column contains the calling party's subaddress. A subaddress can be inputted by the originator of the telephone call or by the originating terminal equipment and can provide additional information about the calling party. For example, a calling party subaddress of "13" may indicate that the caller is a married white female between 30–50 years of age with an annual income in excess of $50,000.

The third column contains the called party's telephone number. The fourth column contains a called party subaddress, containing additional information about the purpose of the call. For example, a calling party subaddress of "09" may be a code contained in a magazine advertisement and inputted by the originator of the call which indicates that the caller is interested in learning more about an international stock mutual fund.

In our example of FIG. 4A, the terminal equipment in the inbound telemarketing center would receive a telephone call. The telephone call would be accompanied by call information associated with the telephone call. The terminal equipment would divide the call information into one or more call attributes. The call attributes, in this example, are the calling party number, calling party subaddress, called party number, and called party subaddress. Environment attributes indicating information about the receiver of the call, if present, are determined and added to the call attributes.

These attributes are compared with each number list entry, looking for one or more matches. A "match" can be either an exact match, a wildcard match, or a generic match. An exact match is where all attributes match exactly with all number list data in a number list entry. Note that in the preferred embodiment number list data of "NONE" is considered to be an exact match for an attribute containing no data. A wildcard match is where one or more attributes does not match number list data exactly, but where a truncated version of the attribute does match number list data in a number list entry. For example, the phone number 6081111211 would not exactly match number list data 608#, but a truncated version of the phone number will match. The "#" sign is one of a multitude of representations of a left to right truncation operation. In an alternate embodiment, other wildcards besides left to right truncation could be used. For example, number list data of $555# would match a truncated version of call attribute 6085551111, since this call attribute contains the string "555". The "$" sign is one of a multitude of representations of a right to left truncation operation.

A generic match is where one or more attributes does not match number list data in a number list entry exactly, but where the number list data indicates that any value for the attribute is acceptable. For example, the phone number 6081111211 would not exactly match number list data *ANY, but *ANY indicates that any phone number, including 6081111211, is acceptable.

Note that a number list entry indicated as a wildcard match of a generic match with the attributes from an incoming call and receiver's environment may actually contain one or more number list entries that are identical to a specific attribute. For example, the call attributes "5075553311, 12, 6082224444, 00" from an incoming call would be a generic match with a number list entry of "5075553311, *ANY, *ANY, *ANY", even though the first call attribute, "5075553311" is identical to the first number list data in the number list entry.

In the preferred embodiment, a number list entry cannot be an exact match a wildcard match, or a generic match to the call and environment attributes if any data in the number list entry does not match its attribute. An alternate embodiment would allow this, however, as long as at least one attribute is a match.

A number list entry that is an exact match with incoming call attributes is considered to have "won" the call and can indicate where the call should be routed. If an exact match is not found, the most optimal wildcard or generic match "wins" the call. The method of determining which wildcard or generic match is the most "optimal" will be discussed in more detail later, but is based on the number of number list entries identical to call attributes, and any user-defined weighting of importance of the number list data.

If no exact match, wildcard match, or generic match (as defined above) is found, the call is rejected.

This routing information used by a "winning" number list entry to route the telephone call can either be associated with each number list as a whole, or associated with each number list entry. The routing data can be stored with the number list or number list entry, or stored as part of an application program or other segments of storage 30 (FIG. 2).

Referring again to FIG. 4A, assume that number list 01 is intended to handle the routing of incoming calls for which no detailed information can be ascertained in advance. Any time a number list entry in number list 01 is the "winner" of the incoming call, the incoming call would be routed to the telephone corresponding to number list 01. Number list 02 is intended to handle the routing of incoming calls for "special customers" who have already called before or for whom their telephone number and perhaps other information has already been obtained. These customers can be routed quickly and accurately to the telemarketer operating the telephone corresponding to number list 02. Enough detailed information can be included with the call to enable the telemarketer to answer the phone with a very personalized greeting, such as "Hello, Ms. Applegate! Have you made any decisions about that sweater you were asking about before? "

Number list 03 is intended to handle the routing of incoming calls from customers who have not called before but who have indicated a specific inquiry. For example, any incoming call containing a called party subaddress of "21" would indicate that the customer wants to know more about medications to reverse male pattern baldness, so the call can automatically be routed to a telemarketer knowledgeable in this subject.

Figure 4B:
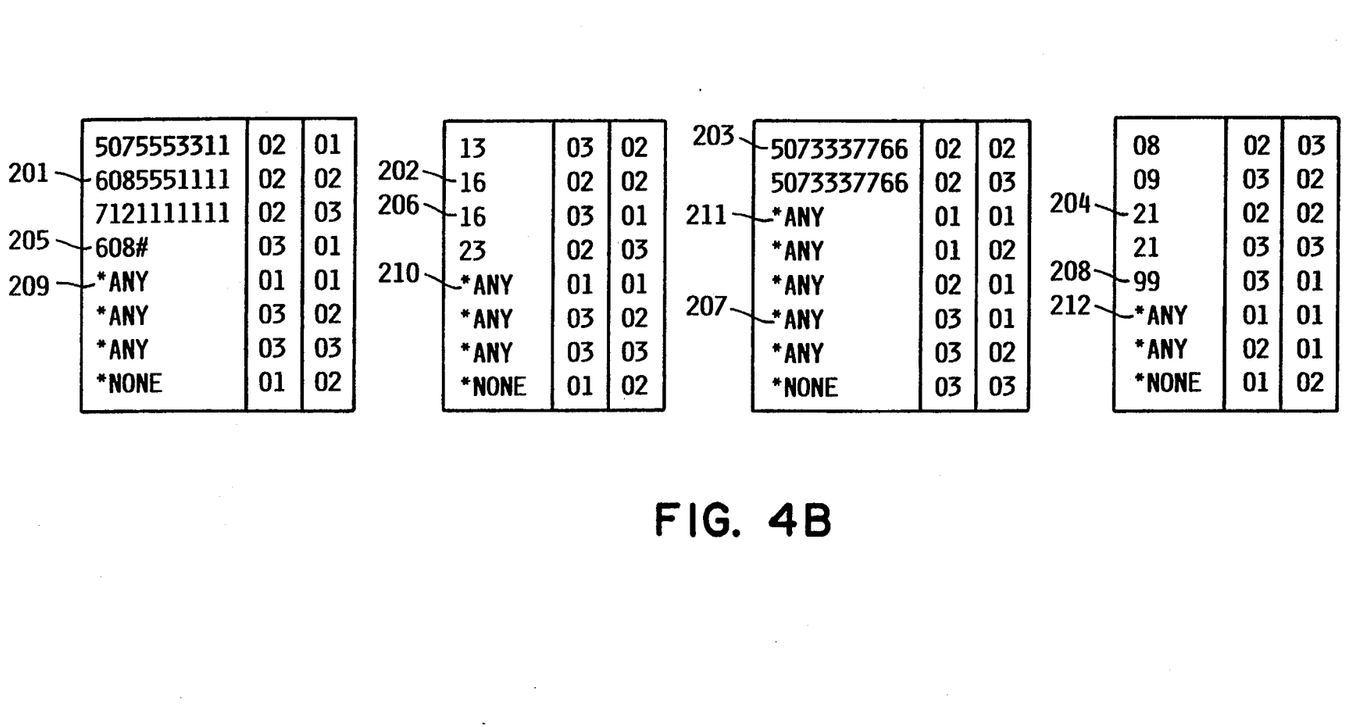
FIG. 4B shows exemplary search trees for the number lists of FIG. 4A.

FIG. 4B shows the search trees associated with the number lists of FIG. 4A. As discussed previously, each search tree contains sorted number list data from a corresponding column of each number list.

Figure 5:
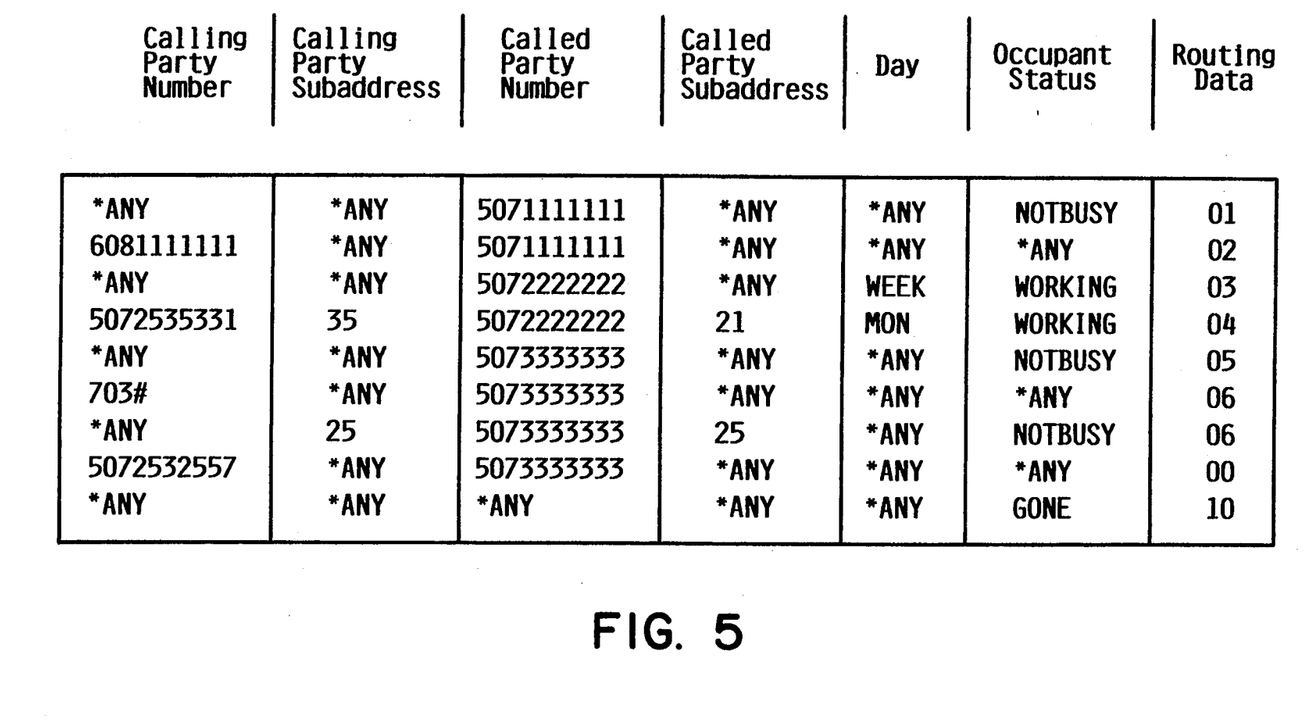
FIG. 5 shows an exemplary number list of the invention used in an alternate embodiment.

FIG. 5 shows an exemplary number list of the invention that could be used in a residential or small office application, where the terminal equipment receives only a few telephone calls daily. One number list is shown. This number list contains seven columns of number list data. The first four columns have been described previously. The fifth column indicates the day of the week the call was received. This information can either be received as a call attribute or determined by processor 23 (FIG. 2) by querying the system date stored in storage 30. The sixth column contains occupant status information. This information is used to match an "environment attribute" not included as part of an incoming call but indicated by the receiver of the call. If one or more environment attributes are present, they are added to and treated the same as the call attributes received with the call, as will be explained in more detail later. In our example, occupant status information indicates if the occupants are gone, not busy, or working. The last column contains routing information. Unlike the example of FIG. 3A, this routing data is stored directly in each number list entry.

In our example of FIG. 5A, the terminal equipment is contained in a master telephone located in the Johnson family's house. The Johnson's have three phone lines coming into their house: 5071111111 is the residence phone number, 5072222222 is the phone number of Ms. Johnson's small accounting business she has in their basement, and 507333333 is the phone number of the Johnson's talkative teenager, Tiffany.

A routing code of "01" and "02" both route an incoming call to the phone in the kitchen, but "02" rings the phone with a double ring. Likewise, "03" and "04" both route an incoming call to the phone in the basement office, with "04" causing a double ring, and "05" and "06" both route an incoming call to the phone in Tiffany's bedroom, with "06" causing a double ring. A routing code of "00" indicates explicitly that the call should not be accepted, and a routing code of "10" indicates that the call should be routed to the family answering machine.

If the first entry of the number list is the "winning" entry, the incoming phone call will be routed to the phone in the kitchen and ring with a single ring. If the fourth entry of the number list is the "winning" entry, the incoming phone call is from a special client of Ms. Johnson's business and is routed to the phone in her office and rings with a double ring. If the eighth entry of the number list is the "winning" entry, the call is from James Jilted, Tiffany's old boyfriend. Tiffany inputted this entry into the number list so that incoming phone calls received from James' telephone number would not be accepted.

In the preferred embodiment, search trees similar to the search trees of FIG. 4B are associated with the number list of FIG. 5. As discussed previously, each search tree contains sorted number lilt data from a corresponding column of the number list. In the case of a single number list or a small number of number lists, the productivity enhancement of using search trees may not justify their use.

FIGS. 6A-6C show a flowchart of how terminal equipment 20 is programmed to carry out the invention. Block 101 initializes a variable called "Count" for each number lists entry to a value of −1. Block 102 parses or divides the call information associated with the incoming call into one or more call attributes. Using our example of our inbound telemarketing application of FIG. 4, block 102 parses the call information into four call attributes known as Attribute(1), Attribute(2), Attribute(3), and Attribute(4). Attribute(1) corresponds to calling party number, Attribute(2) corresponds to calling party subaddress, and so on. Block 102 also makes a backup copy of these attributes so that the flowchart of FIGS. 6A-6C always operate on the correct information. This backup copy is used to restore the attribute to its original value if the attribute becomes truncated or genericized as part of a specific processing operation.

Block 110 checks to see if any environment attributes will be needed as part of the decision process. As discussed previously, an environment attribute is not a part of a call but indicated by the receiver of the call. If one or more environment attributes (such as occupant status of FIG. 5A) exist, the value of the attributes are determined and they are added to the call attributes determined in block 102. A backup copy of the environment attributes is also made in block 110. In our example, there are no environment attributes.

To help explain the flowchart, lets assume that a call is received and block 102 parses the call information into the following Attributes:
Attribute(1)=6085551111
Attribute(2)=16
Attribute(3)=5073337766
Attribute(4)=21

Block 103 searches the first search tree for an entry that matches Attribute (1). Block 103 determines that entry 201 of the first search tree matches Attribute(1), so block 104 is answered affirmatively. Block 105 remembers the number list (02) and the row of the number list (also 02) contained in entry 201. Block 106 asks if Attribute(1) is *ANY or indicates a wildcard match. Since we have an exact match, block 106 is answered negatively, and block 107 sets the Count for this number list entry equal to the user-defined weight of Attribute(1). The telemarketing center has the ability to decide that some call attributes are more important than others and assign different weighting factors to them. For example, the center might assign a weighting factor of 0.5 to Attribute(2) and a value of 1.0 to the remaining attributes, thereby indicating that Attribute(2) is only half as important as the remaining attributes. For our purposes, let us assume that all attributes have a default weighting factor of 1.0. If this is the case, block 107 sets Count=1. Block 108 sets counter variable "j"=2 in preparation for checking the next attribute.

Block 120 (FIG. 6B) checks to see if the next call attribute matches the next column of number list data in the number list entry that matched the previous call attribute. In our example of FIG. 4, entry 202 of the second search tree is checked to see if the data in the first column of entry 202 matches Attribute(2). Since Attribute(2)=16, a match is made, so flow of control continues to block 122. Block 122 asks if Attribute(j) is *ANY or indicates a wildcard match. Since we have an exact match, block 122 is answered negatively, and block 123 increments Count for this number list entry by the user-defined weight of Attribute(2). In our example, block 123 increments Count to 2.

Block 124 sees if there is another call attribute to check. Since Attribute(3) remains to be checked for a match, the variable "j" is incremented to 3 and blocks 120-123 are reexecuted. These blocks determine that there is a match between search tree entry 203 and Attribute(3), so Count is incremented to 3. Since Attribute(4) remains to be checked, blocks 120-123 are again reexecuted. These blocks determine that there is a match between search tree entry 204 and Attribute(4), so Count is incremented to 4 for this number list entry. Block 124 determines that there are no more attributes to check, so flow of control returns to block 103 of FIG. 6A. In our example, Count=4 indicates an exact match for number list entry 301 of FIG. 4A.

Block 103 checks the first search tree again to see if there are any other matches for Attribute(1). Since no other entries besides entry 201 contain the value "6085551111", no match is found and block 104 is answered negatively. Block 130 asks if all wildcards for Attribute(1) have been checked. Since we haven't checked any wildcards yet, block 130 is answered negatively, and block 132 truncates Attribute(1) by chopping off one character and replacing any chopped off characters with a single "#". Therefore, Attribute(1) is now "608555111#". Blocks 103, 104, 130, and 132 are repeatedly executed until a wildcard match is found or until all characters of Attribute(1) have been truncated. In our example, Attribute(1) is repeatedly truncated until it is "608#". At this point, block 130 finds a match with search tree entry 205, and block 105 is executed to save the number list and row of entry 205. Block 106 once again asks if Attribute(1)=*ANY or is a wildcard match. Since we do have a wildcard match, the variable Count associated with this number lists entry is changed from −1 to 0, thereby indicating that this entry contains a valid match. Block 108 sets j=2 and blocks 120–123 check to see if the first column of search tree entry 206 matches Attribute(2). Since both of these values are 16, there is a match, and Count is incremented to 1.

Block 125 sets j=3 and blocks 120–122 check to see if the first column of search tree entry 207 matches Attribute(3). Since Attribute(3)=5073337766 and the search tree entry contains a *ANY, there is not a match. Block 121 is answered negatively, and flow of control moves to block 140. Block 140 asks if all wildcards for Attribute(3) have been checked. Since we haven't checked any wildcards for this attribute yet block 140 is answered negatively, and block 142 truncates Attribute(3) by chopping off one character and replacing any chopped off characters with a single "#". Therefore, Attribute(3) is now "507333776#". Blocks 103, 104, 130, and 132 are repeatedly executed until a wildcard match is found or until all characters of Attribute(3) have been truncated. In our example, Attribute(1) is repeatedly truncated until the only thing left is a "#", without ever matching the *ANY contained in search tree entry 207. Therefore, all wildcards have been checked and block 140 is answered affirmatively.

Block 150 asks if Attribute(3)=*ANY. Since Attribute(3) is now a "#", block 150 is answered negatively and block 152 sets Attribute(3)=*ANY. Flow returns to block 120 which checks to see if the first column of search tree entry 207 now matches Attribute(3). Since both of these values are now *ANY, there is a match. Block 122 is answered affirmatively, however, so Count is not incremented. As is the case with a wildcard match, the Count is not incremented for a generic match. Block 124 indicates that there is one more attribute to check, so j is incremented to 4, and we go back to block 120.

This time, blocks 120–122 check to see if the first column of search tree entry 208 matches Attribute(4). Since Attribute(4)=21 and the search tree entry contains a 99, there is not a match. Block 121 is answered negatively, and flow of control moves to block 140. Blocks 140 and 142 are executed until Attribute(4)="#" with no match being found. Blocks 150 and 152 then set Attribute(4) to *ANY, but this time block 121 is answered negatively, because *ANY does not match 99. Since all wildcards have been checked and Attribute(4) is *ANY, block 150 is answered negatively. When block 150 is answered negatively, we know that we have found an entry that did not match—i.e. no exact match, wildcard match, or generic match. In the preferred embodiment, a number list entry cannot "win" a call if it contains an entry that doesn't match a call attribute. Therefore, block 155 resets Count back to −1 for this entry, thereby indicating an unacceptable result has been reached. In an alternate embodiment, a number list entry can "win" a call if it contains an entry that doesn't match a call attribute and it has the highest Count. In this embodiment, block 155 does not exist.

In either embodiment block 156 restores the attributes to their original values from the backup copy stored in blocks 102, and/or block 110, and flow again returns back to block 103. Block 103 checks the first search tree again to see if there are any other matches for Attribute(1). Since no other entries besides entry 201 contain the value "6085551111", no match is found, and block 104 is answered negatively. Block 130 asks if all wildcards for Attribute(1) have been checked. Since we have checked these wildcards already, block 130 is answered positively. Block 160 asks if Attribute(1)=*ANY. Since Attribute(1) is not *ANY, block 160 is answered negatively, and block 162 sets Attribute(1)=*ANY. Flow returns to block 103 which checks to see if the first column of search tree entry 209 now matches Attribute(1). Since both of these values are now *ANY, there is a match. Blocks 104 and 106 are answered affirmatively, and block 109 sets the Count for the entry to 0.

Blocks 120, 121, 140, 150 152 103–108, 120, 121, 122, 124, and 125 are repeatedly executed and determine that search tree entries 210, 211, and 212, like search tree entry 209, all contain generic matches. Block 124 is answered negatively when the last attribute has been checked, and flow returns back to block 103. Note that the Count for this number list entry is 0.

Block 103 eventually finds the other instances where *ANY is located in the first column of a search tree entry and eventually determines that these number list entries are not acceptable since they contain one or more mismatches. When all of these entries have been checked, block 160 is answered affirmatively, indicating that all searching is complete. Flow of control moves to block 170.

Block 170 searches for the number list entry with the highest Count. It determines that number list entry 301 has a Count of 4, entry 302 has a Count of 1, entry 303 has a Count of 0, and the remainder of the entries have Counts of −1. Therefore, it determines that number list entry 301 is the "winner" with a count of 4. In the case of a tie, the "winner" can be selected randomly, or another tie breaking mechanism can be used.

Block 171 asks if the Count for the winning number list entry is valid. In the preferred embodiment, any count greater than or equal to 0 is valid, although this determination could be different if desired. Since number list entry 301 has a valid count of 4, block 172 routes the call as indicated in the number list entry or number list. In our example, the call is routed to the telemarketer corresponding to number list 02, since number list entry 301 is a member of number list 02. The program then ends in block 190. If a valid number list was not found, the call would be rejected in block 175.

Figure 7A:
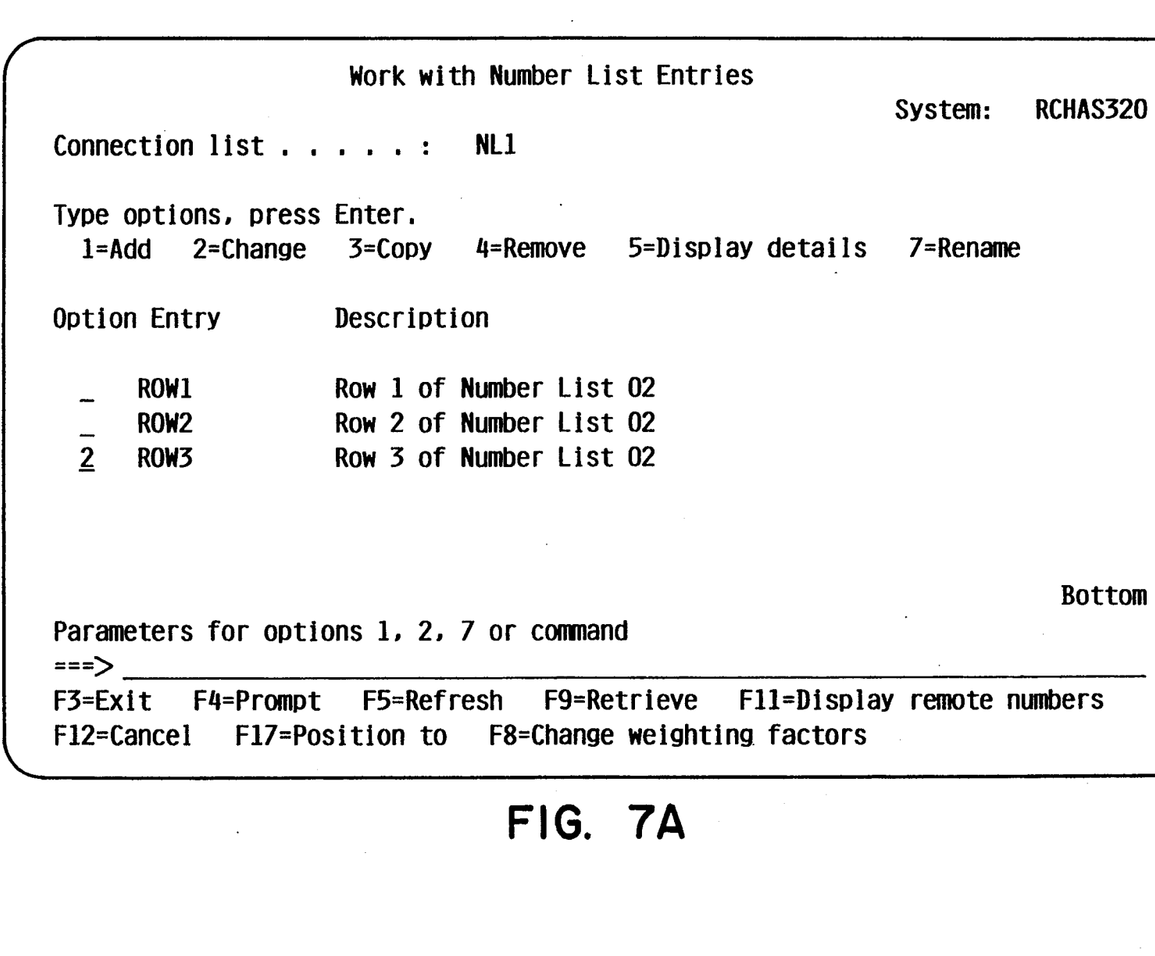
FIGS. 7A-7C show computer screens used to modify information contained in the number lists of the invention.
Figure 7B:
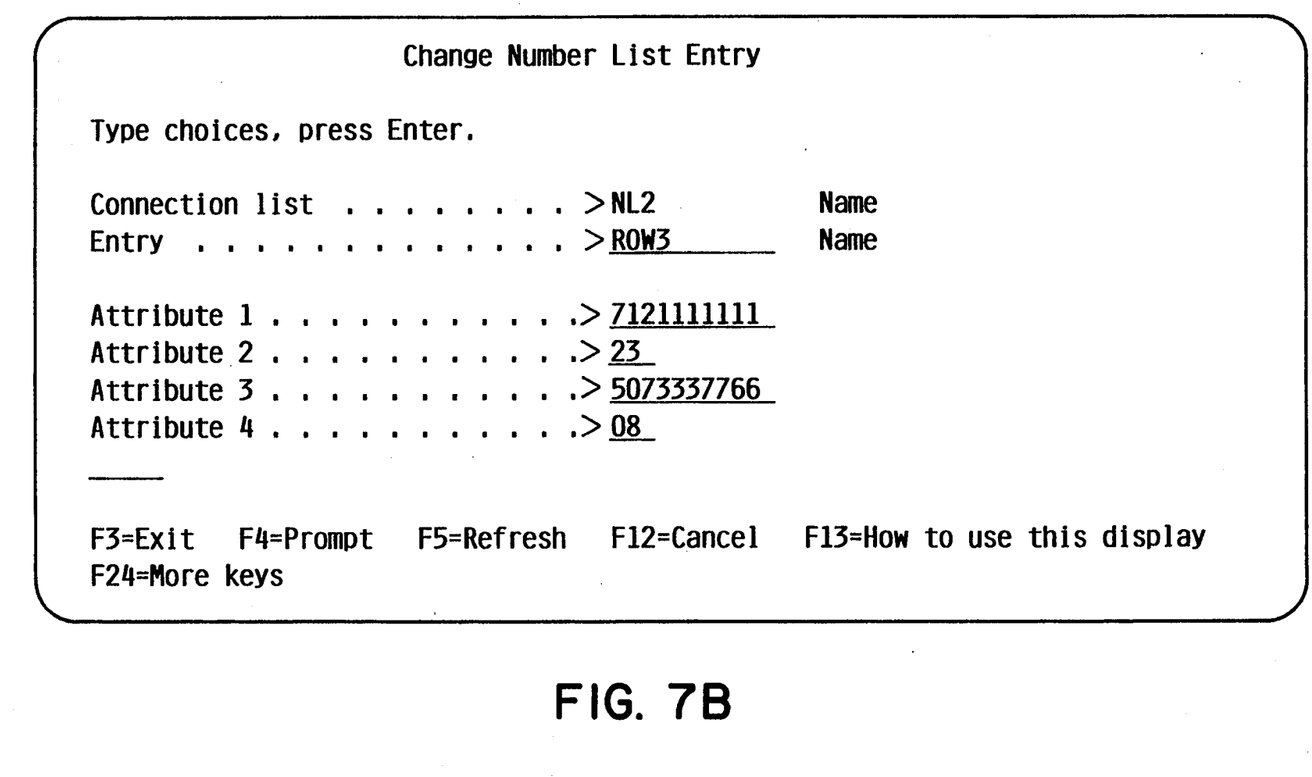
Figure 7C:
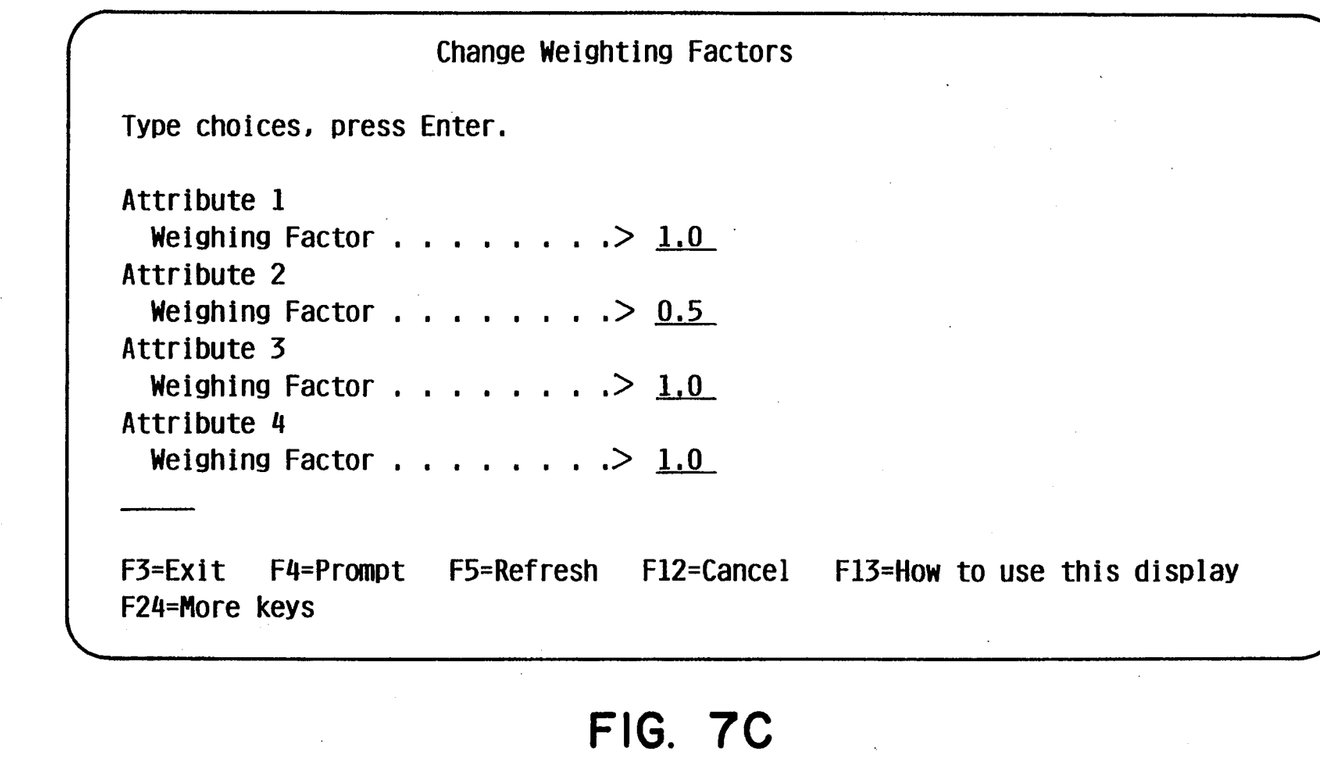

The number list data contained in the number lists, as well as the weights assigned to the call attributes, can be easily modified by the user, as shown in the screens of FIG. 7.

While this invention has been described with respect to the preferred embodiment, it will be understood by those skilled in the art that various changes in detail may be made therein without departing from the spirit, scope and teaching of the invention. For example, although most of the discussion has concentrated on voice applications, acceptance/rejection and routing of data calls between computers could also use this invention. This invention would be particularly useful as a security mechanism for remote terminals connected to a host computer via a dial-up network. In addition, other mechanisms for inputting/changing data in a number list, such as using the keypad of the telephone itself, could be used instead of the screens of FIGS. 7A-C. Accordingly, the herein disclosed is to be limited only as specified in the following claims.

What is claimed is:

1. A method for handling a call based on call information associated with said call, said call information being supplied by a network, said method comprising the steps of:
    dividing said call information into a plurality of call attributes;
    determining an environment attribute, said environment attribute being added to said call attributes;
    identifying a single number list, said single number list being one of a plurality of individual number lists, each of said individual number lists containing information about a particular category of call information;
    searching said single number list for a number list entry with contents that match said plurality of call attributes and said environment attribute;
    accepting said telephone call whenever said number list entry is found in said searching step; and
    rejecting said telephone call whenever said number list entry is not found in said searching step.

2. The method of claim 1, wherein said searching step further comprises the step of:
    deciding whether said contents of said number list entry are an exact match with said plurality of call attributes.

3. The method of claim 1, wherein said searching step further comprises the step of:
    deciding whether a wildcard number list entry exists in said number list that can be used as a match against said plurality of call attributes.

4. The method of claim 1, wherein said searching step further comprises the step of:
    deciding whether a generic number list entry exists in said number list that can be used as a match against said plurality of call attributes.

5. The method of claim 1, wherein said searching step comprises the step of:
    searching a search tree that is associated with said single number list for a number list entry with contents that match said plurality of call attributes and said environment attribute.

6. The method of claim 1, wherein said call is telephone call.

7. The method of claim 1, wherein said call is a data call.

8. A method for routing a call based on call information associated with said telephone call, said call information being supplied by a network, said method comprising the steps of:
    dividing said call information into a plurality of call attributes;
    searching a number list for a first matching number list entry with contents that match said plurality of call attributes;
    finding said first matching number list entry;
    assigning a first count to said first matching number list entry, said first count representing how well said first matching number list entry matches said plurality of call attributes relative to other matching number list entries;
    searching said number list for a second matching number list entry with contents that match said plurality of call attributes;
    finding said second number list entry;
    assigning a second count to said second number list entry, said second count representing how well said second matching number list entry matches said plurality of call attributes relative to said other matching number list entries;
    determining whether said second count indicates a better match than said first count; and
    routing said call to a destination associated with said second number list entry if said second count is determined to be said better match.

9. The method of claim 8, wherein said first assigning step further comprises the steps of:
    indicating in said first count that said first matching number list entry contains a valid match;
    determining a weighing factor for each of said plurality of call attributes; and
    incrementing said first count by said weighing factor associated with one of said plurality of call attributes each time data in said number list entry exactly matches said one of said plurality of call attributes.

10. The method of claim 9, wherein said weighing factor is adjusted via user input.

11. The method of claim 9, wherein said plurality of call attributes include an environment attribute.

12. The method of claim 9, wherein said call is telephone call.

13. The method of claim 9, wherein said call is a data call.

14. An apparatus for handling a call based on call information associated with said call, said call information being supplied by a network, said apparatus comprising:
    means for dividing said call information into a plurality of call attributes;
    means for determining an environment attribute, said environment attribute being added to said plurality of call attributes;
    means for identifying a single number list, said single number list being one of a plurality of individual number lists, each of said individual number lists containing information about a particular category of call information;
    means for searching said single number list for a number list entry with contents that match said plurality of call attributes and said environment attribute;
    means for accepting said telephone call whenever said number list entry is found in said searching step; and
    means for rejecting said telephone call whenever said number list entry is not found in said searching step.

15. The apparatus of claim 14, wherein said means for searching further comprises:
    means for deciding whether said contents of said number list entry are an exact match with said plurality of call attributes.

16. The apparatus of claim 14, wherein said means for searching further comprises:
    means for deciding whether a wildcard number list entry exists in said number list that can be used as a match against said plurality of call attributes.

17. The apparatus of claim 14, wherein said means for searching further comprises:
    means for deciding whether a generic number list entry exists in said number list that can be used as a match against said plurality of call attributes.

18. The apparatus of claim 14, wherein said means for searching comprises:
    means for searching a search tree that is associated with said single number list for a number list entry with contents that match said plurality of call attributes and said environment attribute.

19. The apparatus of claim 14, wherein said call is telephone call.

20. The apparatus of claim 14, wherein said call is a data call.

21. An apparatus for routing a call based on call information associated with said call, said call information being supplied by a network, said apparatus comprising:
    means for dividing said call information into a plurality of call attributes;
    means for searching a number list for a first matching number list entry with contents that match said plurality of call attributes;
    means for finding said first matching number list entry;
    means for assigning a first count to said first matching number list entry, said first count representing how well said first matching number list entry matches said plurality of call attributes relative to other matching number list entries;
    means for searching said number list for a second matching number list entry with contents that match said plurality of call attributes;
    means for finding said second matching number list entry;
    means for assigning a second count to said second number list entry, said first count representing how well said first matching number list entry matches said plurality of call attributes relative to said other matching number list entries;
    means for determining whether said second count indicates a better match than said first count; and
    means for routing said call to a destination associated with said second number list entry if said second count is determined to be said better match.

22. The method of claim 21, wherein said first assigning means further comprises:
    means for indicating in said first count that said first matching number list entry contains a valid match;
    means for determining a weighing factor for each of said plurality of call attributes; and
    means for incrementing said first count by said weighing factor associated with one of said plurality of call attributes each time data in said number list entry exactly matches said one of said plurality of call attributes.

23. The apparatus of claim 22, wherein said weighing factor is adjusted via user input.

24. The apparatus of claim 22, wherein said plurality of call attributes include an environment attribute.

25. The apparatus of claim 22, wherein said call is telephone call.

26. The apparatus of claim 22, wherein said call is a data call.

* * * * *